(12) United States Patent
El-Khoury et al.

(10) Patent No.: US 11,370,061 B2
(45) Date of Patent: Jun. 28, 2022

(54) OPTICAL ARRANGEMENT FOR DIRECT LASER INTERFERENCE STRUCTURING

(71) Applicant: FRAUNHOFER-GESELLSCHAFT ZUR FOERDERUNG DER ANGEWANDTEN FORSCHUNG E.V., Munich (DE)

(72) Inventors: Mikhael El-Khoury, Dresden (DE); Andres Fabian Lasagni, Grumbach (DE); Sabri Alamri, Dresden (DE); Tim Kunze, Dresden (DE); Bogdan Voisiat, Dresden (DE)

(73) Assignee: FRAUNHOFER-GESELLSCHAFT ZUR FOERDERUNG DER ANGEWANDTEN FORSHUNG E.V., Munich (DE)

( * ) Notice: Subject to any disclaimer, the term of this patent is extended or adjusted under 35 U.S.C. 154(b) by 99 days.

(21) Appl. No.: 16/954,666

(22) PCT Filed: Nov. 20, 2018

(86) PCT No.: PCT/EP2018/081895
§ 371 (c)(1),
(2) Date: Jun. 17, 2020

(87) PCT Pub. No.: WO2019/134769
PCT Pub. Date: Jul. 11, 2019

(65) Prior Publication Data
US 2020/0306879 A1    Oct. 1, 2020

(30) Foreign Application Priority Data
Jan. 3, 2018 (DE) ..................... 10 2018 200 036.0

(51) Int. Cl.
*B23K 26/06* (2014.01)
*B23K 26/0622* (2014.01)

(52) U.S. Cl.
CPC ...... *B23K 26/0648* (2013.01); *B23K 26/0622* (2015.10); *B23K 26/0652* (2013.01)

(58) Field of Classification Search
CPC ............ B23K 26/0643; B23K 26/0648; B23K 26/067; B23K 26/355; B23K 26/00;
(Continued)

(56) References Cited

U.S. PATENT DOCUMENTS 3,488,104 A * 1/1970 Doherty ................. G02B 21/00
359/364
3,489,908 A * 1/1970 Heitmann ................ G01D 5/38
250/237 R
(Continued)

FOREIGN PATENT DOCUMENTS

DE  102011011734   8/2012
DE  102011101415   11/2012
(Continued)

OTHER PUBLICATIONS

International Search Report.
German Office Action.

*Primary Examiner* — Ibrahime A Abraham
*Assistant Examiner* — Chris Q Liu
(74) *Attorney, Agent, or Firm* — Jacobson Holman PLLC

(57) ABSTRACT

An optical arrangement for direct laser interference structuring. A laser beam is directed to a reflecting mirror with inclined surface and strikes a first beam splitter, it is divided into two partial beams and one partial beam is deflected to a focusing element. The second partial laser beam is directed to a first pentamirror and after multiple reflection and/or refraction, the focusing element, or it is directed to a second beam splitter and is divided into a first partial beam and a third partial beam. The partial beams are directed to the focusing element by the first pentamirror and are directed by the focusing element to the surface to be structured inter- (Continued)

fering with each other. The reflecting mirror is moved in a translational manner, maintaining a 45° angle parallel to the optical axes of the emitted laser beam influencing the interference period Λ.

7 Claims, 4 Drawing Sheets

(58) Field of Classification Search
CPC ............ B23K 26/0608; B23K 26/0622; B23K 26/0652; B23K 26/0676; B23K 26/0738; B23K 26/0821; B23K 26/0823; B23K 26/083; B23K 26/352; G02B 27/10
USPC .............. 219/121.6, 121.75, 121.78, 121.73, 219/121.76, 121.83, 121.84
See application file for complete search history.

(56) References Cited

U.S. PATENT DOCUMENTS

| | | | | |
|---|---|---|---|---|
| 3,556,660 | A * | 1/1971 | Mottier | G01B 9/02028 356/498 |
| 6,549,309 | B1 | 4/2003 | Monaghan et al. | |
| 8,546,762 | B1 * | 10/2013 | Roehle | G01J 3/2889 250/341.1 |
| 8,877,129 | B2 * | 11/2014 | Brandenburg | G01N 21/648 422/82.11 |
| 9,058,994 | B2 * | 6/2015 | Kawakami | H01L 21/0268 |
| 9,164,397 | B2 * | 10/2015 | Manassen | G03F 7/70633 |
| 9,625,323 | B2 * | 4/2017 | Sartorius | G01J 11/00 |
| 9,793,673 | B2 * | 10/2017 | Chuang | H01S 3/0057 |
| 2004/0227927 | A1 | 11/2004 | Battiato et al. | |
| 2008/0083886 | A1 * | 4/2008 | Faklis | G02B 27/0905 250/504 R |
| 2009/0213457 | A1 * | 8/2009 | Soon | A61B 90/20 359/388 |
| 2010/0033731 | A1 | 2/2010 | Shimizu | |
| 2011/0228260 | A1 * | 9/2011 | Yablon | G01B 9/02084 356/73.1 |
| 2014/0204436 | A1 | 7/2014 | Li et al. | |
| 2014/0291308 | A1 * | 10/2014 | Lasagni | B23K 26/0676 219/121.75 |

FOREIGN PATENT DOCUMENTS

| | | |
|---|---|---|
| DE | 102011119764 | 5/2013 |
| DE | 102012011343 | 12/2013 |
| EP | 0668519 | 8/1995 |
| EP | 2431120 | 3/2012 |

* cited by examiner

OPTICAL ARRANGEMENT FOR DIRECT LASER INTERFERENCE STRUCTURING

BACKGROUND OF THE INVENTION

The invention relates to an optical arrangement for direct laser interference patterning (DLIP), by which a patterning can be formed on surfaces of workpieces or components made of a wide variety of materials. In doing so, the surface does not necessarily have to be the direct surface pointing outward. It can also be a surface covered by a material at least partially transparent to the laser radiation used.

This method allows high resolution patternings to be formed so that high requirements are placed on the used optical elements and their arrangement with respect to one another in order to be able to utilize the required interference effects.

In doing so, a laser beam should be split into partial beams and the beam should be guided along the optical path in such a way that only minimal power losses occur. The distances traveled by the individual partial beams should not differ or should only very marginally differ, particularly when ultra-short pulse laser sources are used. The possibility of changing the interference period Λ according to requirements is also an important factor. Naturally, the aim should be to keep the costs and the adjustment complexity for an arrangement usable for the DLIP as small as possible.

A laser beam is usually split into a plurality of partial beams by beam splitters, prisms or diffractive optical elements (DOEs).

Thus, there are configurations having reflecting elements, though it is not possible to influence the interference period Λ with these. But these embodiments are neither compact nor cost-effective, and are susceptible in respect of alignment.

The use of a DOE having two optical lenses is also known. An ability to change the interference period cannot be achieved therewith either. Although the beam splitting by means of a DOE constitutes a practical and compact solution, there are significant power losses as a result of the used diffractive. Furthermore, DOEs have a low damage threshold, high manufacturing costs and can only be designed for one wavelength of laser radiation.

For generating interference patterns, configurations having two biprisms are also known. Here, an incident laser beam must have a beam cross section which can cover a significant area of a prism. The splitting ratio of the energy with regard to the partial beams is strongly dependent on the orientation and arrangement of the prisms. Moreover, no more than two partial beams interfering with one another can be used.

In an embodiment having a diffractive element and a biprism, the power losses caused by the diffractive element likewise have a disadvantageous effect. Though the interference period Λ can influenced or changed by means of changing the partial beam distance, the configuration remains expensive and, moreover, symmetrical three-beam interference cannot be realized. Here, too, a DOE can only be designed for one wavelength.

For example, a device and a method for interference patterning of samples and samples manufactured in such a way are known from DE 10 2012 011 343 A1.

DE 10 2011 119 764 A1 relates to a device and a method for interference patterning flat samples.

An optical arrangement for laser interference patterning is disclosed in DE 10 2011 101 415 A1.

A device, arrangement and a method for interference patterning are described in DE 10 2011 011 734 A1.

U.S. Pat. No. 6,549,309 B1 relates to a holography device by means of which holographic patterns can be produced.

A laser distance measuring apparatus is known from US 2010/0033731 A1.

SUMMARY OF THE INVENTION

It is therefore the object of the invention to specify direct laser interference patterning possibilities which are associated with a simple and cost-effective optical assembly, which can be flexibly adapted to various patterning tasks, in which laser radiation is used with different wavelengths and with which a change in the interference period Λ is possible in a simple and reliable manner.

This object is achieved according to the invention by an optical arrangement having the features of the claims.

In the optical arrangement for direct laser interference patterning according to the invention, a laser beam emitted from a laser radiation source is directed to an element which reflects the laser beam and the reflective surface of which is oriented at an angle of 45° in relation to the optical axis of the laser beam.

The laser beam reflected by the reflecting element is incident on a first beam splitter, which splits the reflected laser beam into two partial beams. A partial beam which has been obtained by the first beam splitter is reflected by means of the first beam splitter and its optical axis is deflected in the direction of a focusing optical element.

In a first alternative according to the invention, a second partial beam transmitted through the first beam splitter is incident on a first pentamirror, in particular a roof-pentamirror, or a pentaprism and is thereby directed to the focusing optical element in a manner parallel to the optical axis of the first partial beam after multiple reflections and/or refractions.

In a second alternative according to the invention, a transmitted second partial beam obtained by the first beam splitter is directed to a second beam splitter, which splits the second partial beam into a reflected third partial beam and the proportion of the second partial beam transmitted at the second beam splitter, and the reflected third partial beam is directed to the focusing element parallel to the optical axis of the first reflected partial beam of the first beam splitter by a first pentamirror, in particular a roof pentamirror, or a pentaprism and the transmitted proportion of the second partial beam is directed to a second pentamirror, in particular a roof pentamirror, or a pentaprism and thus is directed to the focusing optical element in a manner parallel to the optical axes of the first partial beam and of the reflected third partial beam after multiple reflections and/or refractions.

In both alternatives, in order to form a patterning on or in the region of a surface, the partial beams oriented with their optical axes parallel to one another are directed to said surface by the focusing optical element, preferably a lens, in a manner interfering with one another.

Furthermore, the reflecting element ought to be displaceable parallel to the optical axis of the laser beam emitted from the laser beam source and in a manner maintaining the angle of 45°, for influencing the interference period Λ. This relates in particular to the orientation, arrangement and position of the reflecting area of the reflecting element which deflects the laser beam by 45°.

The reflecting element should advantageously be displaceable over a maximum distance along the optical axis corresponding to the length of a cathetus of an isosceles triangle, in which the length of the area of the first beam splitter is the hypotenuse. Here, the length of the cathetus is the distance the edge, for example an outer edge, of the reflecting element travels during the displacement. Thus a maximum bandwidth can be utilized when varying the interference period $\Lambda$.

A plane-parallel waveplate can be arranged in the beam path of at least one partial beam upstream of the focusing optical element. Thus the polarization of the respective partial beam can be individually influenced.

Advantageously, reflecting elements can be arranged in the beam path of the first partial beam in such a way that the first and the second partial beam and if necessary a third partial beam each travel a distance of equal length until being incident on the focusing optical element. In doing so, the first partial beam can be reflected out of, and back into, the original optical axis multiple times. This is necessary in particular when using pico- or femtosecond laser beam sources.

The partial beams can also be directed through a Dove prism arranged between the first beam splitter, the pentamirror/pentamirrors or the pentaprism, the pentamirrors or pentaprisms and the focusing element. In doing so, the partial beams are refracted and reflected. Here, the principal axis of the Dove prism and the optical axis OA are parallel and congruent.

During the patterning, the Dove prism can be rotated about an axis, which is the optical axis OA or an axis which is oriented parallel to the optical axes of the partial beams, said axes being oriented parallel to one another. Thus, it is possible to form interference patterns with different angular orientation on the respective surface while forming the patterning.

In the first alternative according to the invention, the first beam splitter should be embodied in such a way that energy proportions in the ratio 50:50 are obtained for a first partial beam and a second partial beam, when two partial beams are directed to the respective surface in a manner interfering with one another In the second alternative according to the invention, the first beam splitter should however be embodied in such a way that energy proportions in the ratio 33:66 are obtained for a first partial beam and a second partial beam and the second beam splitter should be embodied in such a way that energy proportions in the ratio 50:50 are obtained for a first partial beam of the second partial beam and a third partial beam, when three partial beams are directed to the respective surface in a manner interfering with one another.

In the invention, laser beams with different wavelengths can be used without a further adjustment of the arrangement needing to be carried out. Various laser pulse lengths can also be used in the laser operation without problems.

The laser beam can be directed directly from the laser beam source to the reflecting element. Optical elements influencing the focal length and forming the cross section of the laser beam can also be arranged in the beam path of the laser beam between laser beam source and the reflecting element.

By varying the position of the reflecting element, the distance can be changed between the optical axes of the partial beams oriented parallel to one another. With a displacement of the reflecting area of the reflecting element in the direction of the laser beam source, the distance of the partial beams to one another can be increased and can be decreased by a movement in the opposite direction, which leads to corresponding interference periods $\Lambda$ and correspondingly formed patterns on the respective surface.

The change in the pattern period $\Lambda$ of a formed interference pattern follows the following equation:

$$\Lambda = \lambda/(2\ \sin(\tan^{-1}(h+2)/f)).$$

Here, $\lambda$ is the wavelength of the laser radiation used, f is the focal length of the focusing optical element L and h is the path length of the displacement of the reflecting area of the reflecting element. A diagram for illustration is shown in FIG. 4.

DESCRIPTION OF THE DRAWINGS

The invention will be explained in greater detail by way of example below. In so doing, the features can be combined with one another independently of the respective individual example or its illustration in a figure and the features are not bound to the respective individual example or the individual illustration.

In the figures.

DETAILED DESCRIPTION OF THE INVENTION

Figure 1A:
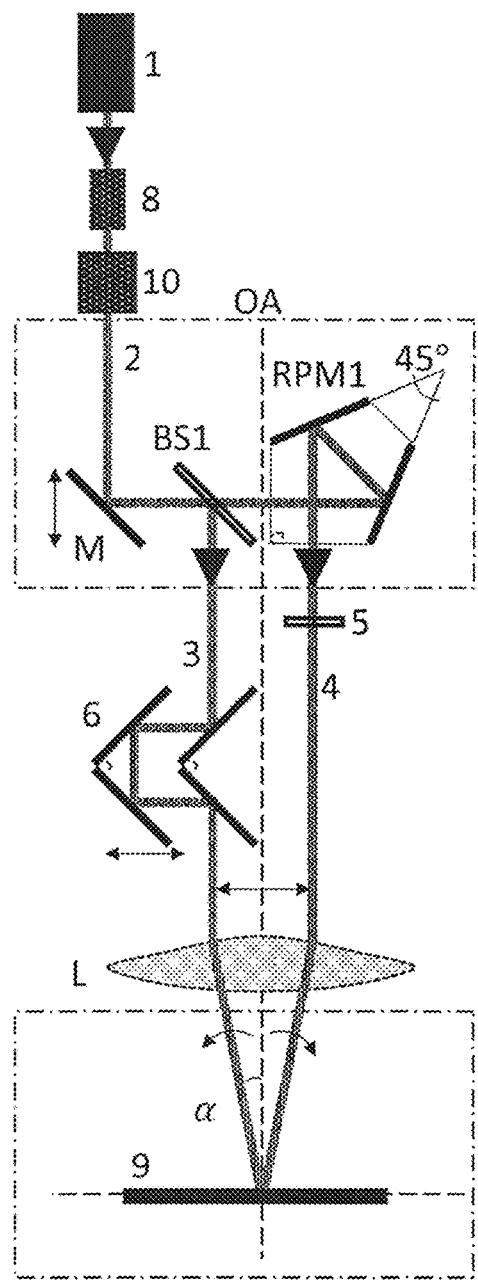
FIG. 1 consisting of FIGS. 1A and 1B show, in schematic form, an example of an optical arrangement according to the invention with two interfering partial beams and influencing of the interference period by means of moving a reflecting element.

FIG. 1A shows a schematic illustration of an example of an arrangement according to the invention, in which two partial beams 3 and 4 which are directed to a surface of a workpiece 9 to be patterned in a manner interfering with one another.

A laser beam 2 is directed from a laser radiation source 1 to a reflecting element M, the reflecting area of which is oriented at an angle of 45° in relation to the optical axis of the laser beam 2 emitted from the laser radiation source 1. The reflected laser beam 2 is incident on a first beam splitter BS1, the area of said beam splitter that the laser beam 2 is incident on being inclined by 45° to said optical axis. A portion of the laser radiation is reflected at this area and in this way a first partial beam 3, having an optical axis parallel to the optical axis of the laser beam 2 originally emitted from the laser radiation source 1, is reflected in the direction of a focusing element L.

A portion of the laser radiation of the laser beam 2 is transmitted through the first beam splitter BS1 so that a second partial beam 4 is incident on reflecting areas of a roof pentamirror RPM1. The second partial beam 4 is thus reflected in such a way that it is directed parallel to the optical axis of the first partial beam 3 in the direction of the focusing element L.

The partial beams 3 and 4 are focused or deflected by the focusing element L in the direction of the surface of the workpiece 9 in a manner interfering with one another, on which surface a patterning should be formed.

In the example shown in FIG. 1A, a plane-parallel waveplate (λ/2 plate) 5 is arranged in the beam path of the second partial beam 4, between the first roof pentamirror RPM1 and the focusing element L.

Reflecting elements 6 are arranged in the beam path of the first partial beam 3, between the first beam splitter BS1 and the focusing element L. The reflecting elements 6 are arranged in such a way and are oriented with their reflecting areas, whereon the first partial beam 3 is incident, in such a way that the difference of the distances which the first partial beam 3 and the second partial beam 4 travel proceeding from the first beam splitter BS1 until being incident on the focusing element L is compensated and both partial beams 3 and 4 thus travel at least nearly or completely the same path distance.

In the example shown in FIG. 1A, an optical telescope 8 and at least one element 10 forming the laser beam 2 are additionally arranged in the beam path of the laser beam 2 downstream of the laser beam source 1.

The double-ended arrow is intended to indicate that the reflecting element M is movable translationally and parallel to the optical axis of the laser beam 2, emitted from the laser beam source 1 and not yet changed in its direction, in order to change the interference period Λ of the two partial beams 3 and 4.

Figure 1B:
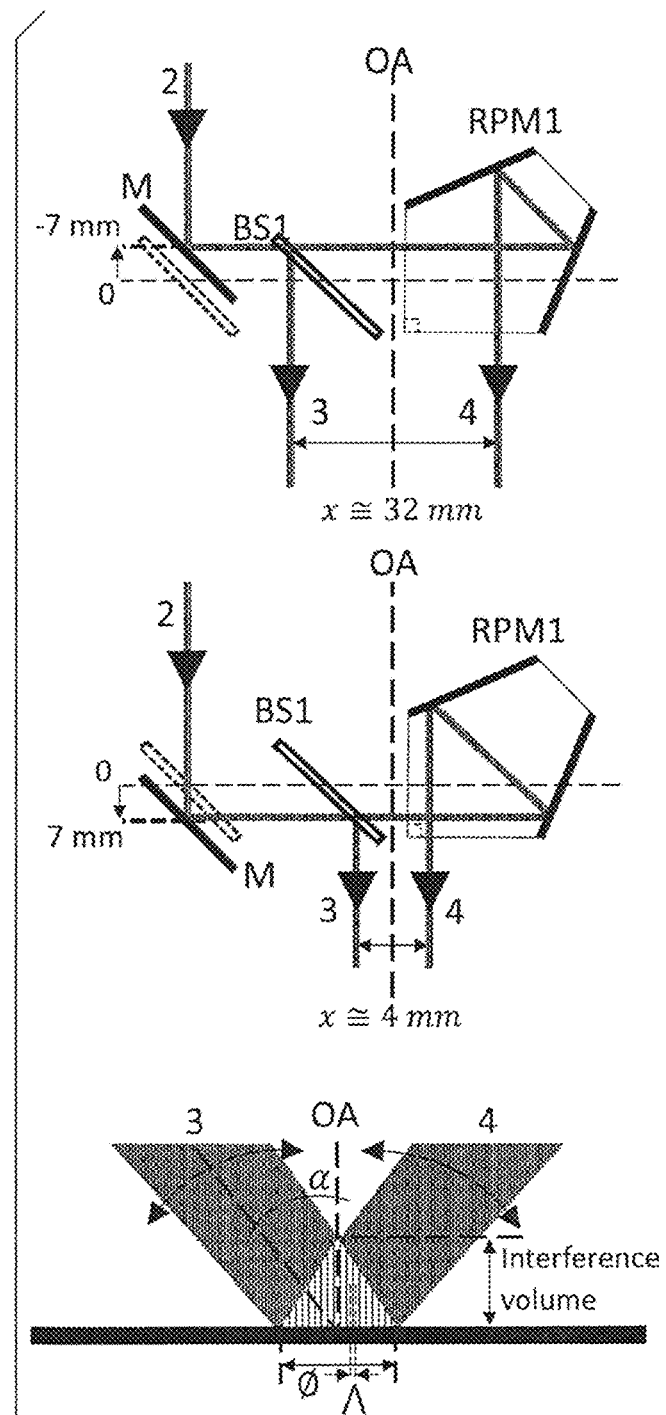

FIG. 1B shows the effect of a translational displacement of the reflecting element M. In the top illustration of FIG. 1B, the reflecting element M is displaced proceeding from a central position by a value of 7 mm in the direction of the laser beam source 1. In this way the optical axis of the laser beam 2 deflected by the reflecting element M is likewise displaced in the direction of the laser beam source 1. The result of this is that the distance between the optical axes of the two partial beams 3 and 4 increases and, in this way, so does the interference period Λ.

In the middle illustration of FIG. 1B, the reflecting element M is likewise translationally displaced proceeding from a central position by a value of 7 mm in the direction of the laser beam source 1 in the direction pointing away from the laser radiation source 1. In this way the optical axis of the portion of the laser beam 2 deflected by the reflecting element M is likewise displaced away from the laser beam source 1. The result of this is that the distance between the optical axes of the two partial beams 3 and 4 decreases and, in this way, so does the interference period Λ.

At the very bottom of FIG. 1B, a partial illustration of the beam paths of the two partial beams 3 and 4 after passing through the focusing element L is shown. The interference volume, which can be obtained by means of the interfering partial beams 3 and 4, is shown in a region above the surface of the workpiece 9, which is intended to be patterned.

In FIGS. 1A and 1B, OA designates the mean optical axis of the obtained partial beams 3 and 4.

The first beam splitter BS1 splits the laser beam 2 in such a way that the partial beams 3 and 4 have at least approximately the same energy.

Figure 2:
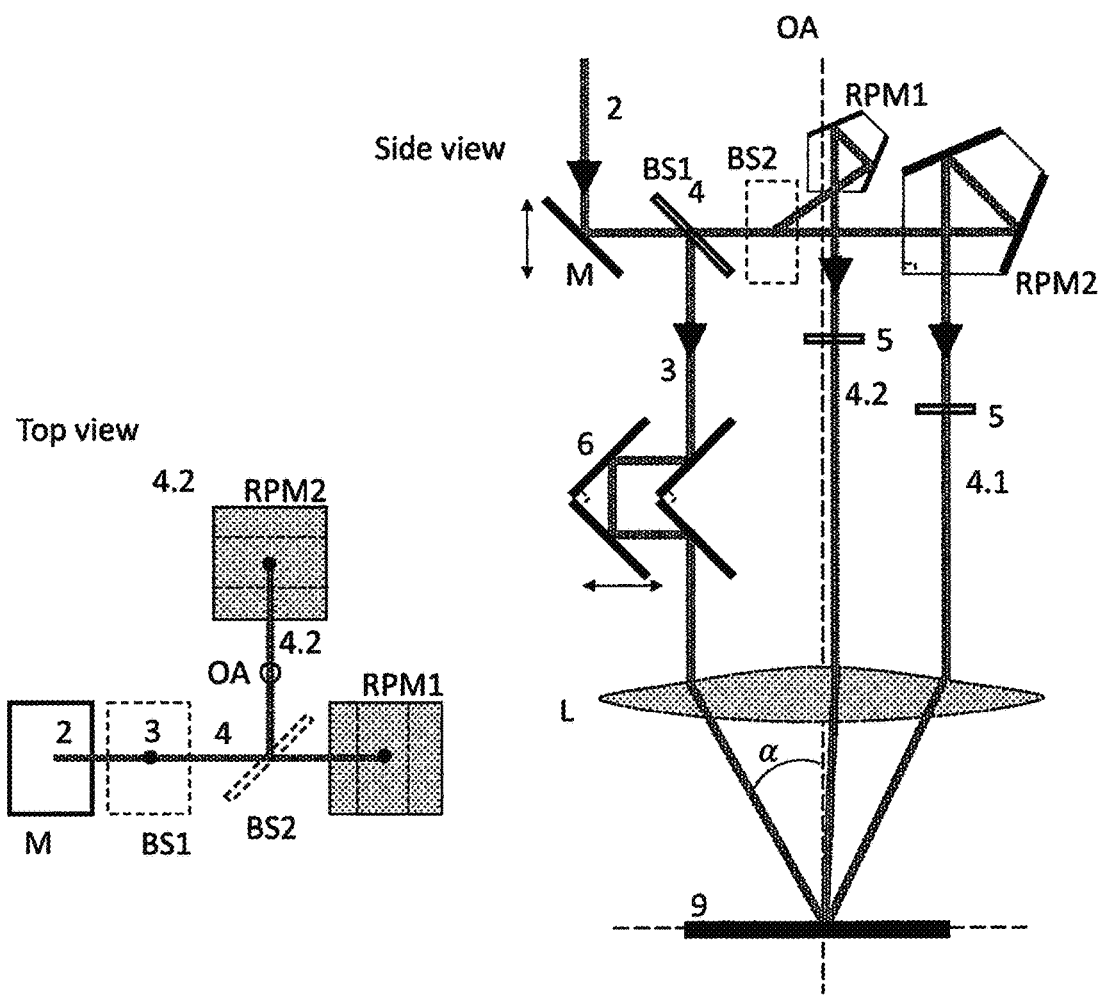
FIG. 2 shows a schematic illustration of a second example of an arrangement according to the invention with three interfering partial beams.

In FIG. 2, a further example of an arrangement according to the invention is shown. Here, a laser beam 2 is directed to an area of a reflecting element M and therefrom is reflected to the first beam splitter BS1, as in the example according to FIGS. 1A and 1B. A first partial beam 3 is reflected from first beam splitter BS1 in the direction of a surface of a workpiece 9. The partial beam 4 transmitted through the first beam splitter BS1 is directed to a second beam splitter BS2. In doing so, a first partial beam 4.1 obtained by the second beam splitter is incident on reflecting areas of a roof pentamirror RPM2. A second partial beam 4.2 obtained by the second beam splitter BS2 is incident on reflecting areas of a roof pentamirror RPM2. The partial beams 4.1 and 4.2 are reflected by the RPM 1 and RPM 2 in the direction of the surface of the workpiece 9 to be patterned.

Apart from the splitting into three partial beams 3, 4.1 and 4.2, the example according to FIG. 2 does not differ from the example according to FIGS. 1A and 1B. In this example, too, partial beams 4.1 and 4.2 can be given a defined polarization by a plane-parallel waveplate (λ/2 plate) 5. Reflecting elements 6 can be arranged in the beam path of the first partial beam 3, between the first beam splitter BS1 and the focusing element L, which reflecting elements can be used for compensating the path lengths of the partial beams 3, 4.1 and 4.2. The three partial beams 3, 4.1 and 4.2 can be directed to the respective surface by the focusing optical element L.

In the left illustration of FIG. 2, this example is shown in a plan view.

Figure 3:
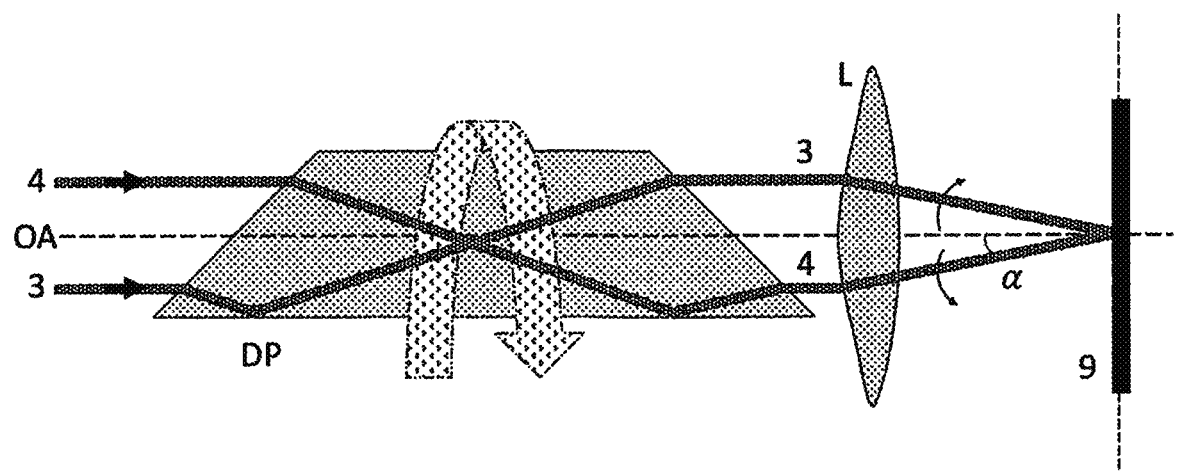
FIG. 3 shows two partial beams guided through a Dove prism.
Figure 4:
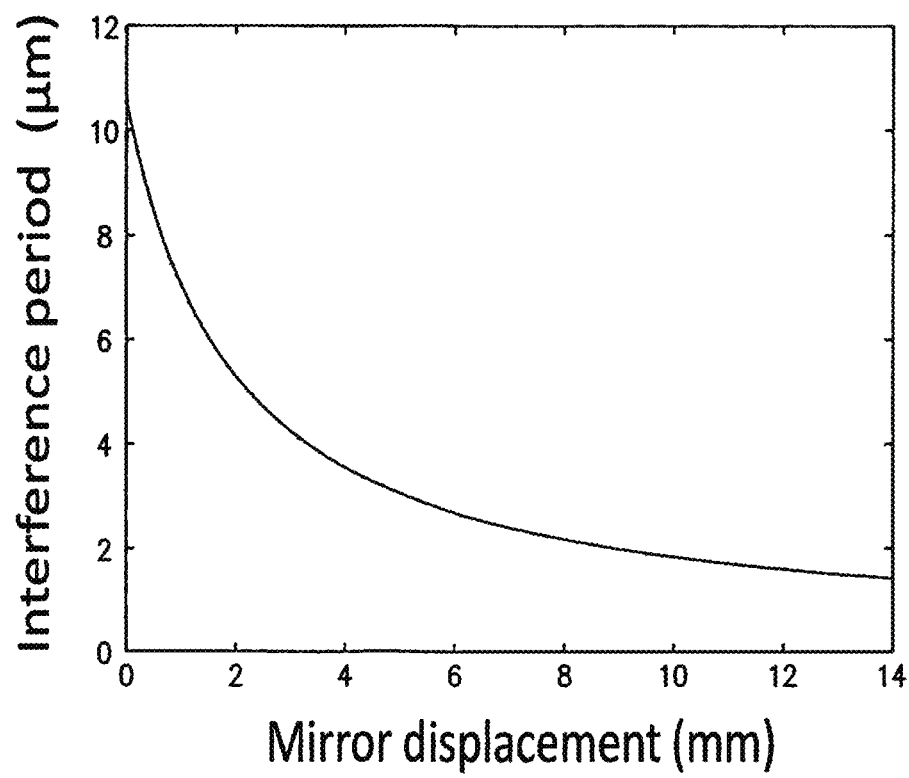
FIG. 4 shows a diagram that illustrates the influence on the interference period in µm by moving the reflecting element in mm and FIG. 5 consisting of FIGS. 5A, 5B, 5C, and 5D shows examples of pattern elements which are manufacturable with an arrangement according to the invention with changing polarization directions.

FIG. 3 schematically shows two partial beams 3 and 4 guided through a Dove prism DP. In doing so, the partial beams 3 and 4 are refracted and reflected multiple times and, in this way, their direction is changed. A change in the orientation of the partial beams 3 and 4, interfering with one another, can be achieved by means of rotating the Dove prism DP about the optical axis OA, which, in addition to the interference with a corresponding interference period Λ, can in turn lead to a possible change in the orientation of pattern elements to be formed on the surface 9.

In FIG. 5, four different calculated interference profile intensities that are producible with the invention are shown, which in turn correspond to accordingly formable pattern elements. The changes can be realized solely through a change in the polarization of partial beams. The polarization vectors used in doing so are indicated with arrows. The polarization can be adapted accordingly by the plane-parallel waveplates 5.

Figures 5A, 5B, 5C, 5D:
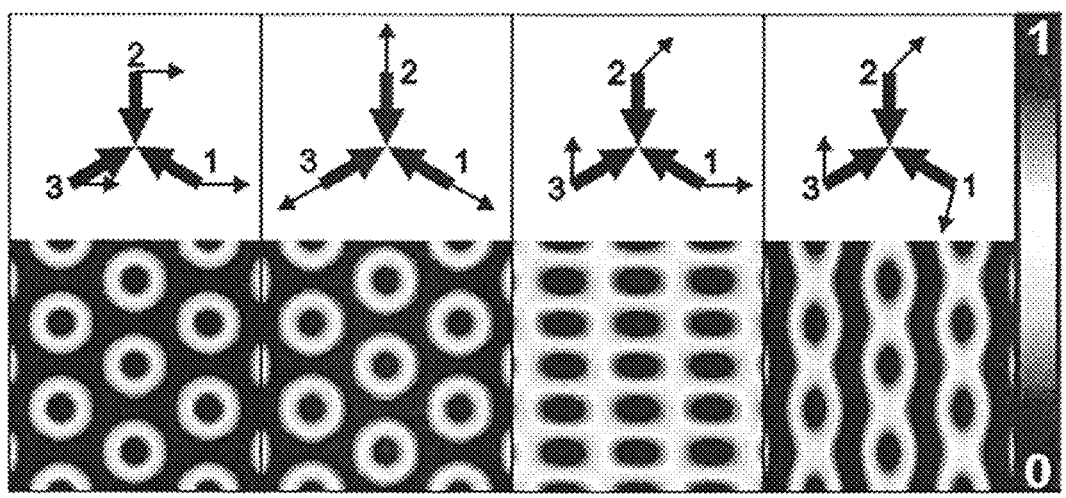

The polarization can be carried out by λ/2 plates for each partial beam individually. FIG. 5A shows a situation, in which each partial beam has an identically oriented polarization. By means of rotating the waveplate, further polarization states can be realized, and so the polarization of each partial beam is oriented at 60° (FIG. 5B), 45° (FIG. 5C) or arbitrarily (FIG. 5D).

The invention claimed is:

1. An optical arrangement for direct laser interference patterning, comprising:
    a laser beam having an optical axis is emitted from a laser beam source and is directed to a reflecting mirror which reflects the laser beam, and the reflecting mirror comprises a reflective surface that is inclined at an angle of 45° in relation to the optical axis of the laser beam;
    the laser beam reflected by the reflecting mirror is directed to a first beam splitter, which divides the reflected laser beam into first and second partial beams, and the first partial beam which has been obtained by the first beam splitter is reflected by the first beam splitter and an optical axis of the first partial beam is deflected in a direction of a focusing optical element;
    the second partial beam transmitted through the first beam splitter is directed to
        a first pentamirror or a pentaprism and thus is directed to the focusing optical element in a manner parallel to the optical axis of the first partial beam after multiple reflections or refractions in the first pentamirror or pentaprism, or a second beam splitter, which splits the second partial beam into a third partial beam and a fourth partial beam, both the third partial beam and the fourth partial beam having an optical axis, the third partial beam is directed on the focusing optical element parallel to the optical axis of the first partial beam after multiple reflections or refractions in the first pentamirror or pentaprism, and the fourth partial beam of the second partial beam and is directed on a second pentamirror or pentaprism and thus is directed to the focusing optical element parallel to the optical axes of the first partial beam and of the third partial beam of the second partial beam after multiple reflections or refractions in the second pentamirror or pentaprism;

in order to form a patterning on or in the region of a surface, the partial beams are directed to the surface by the focusing optical element in a manner interfering with one another; and the reflecting mirror is translationally displaceable parallel to the optical axis of the laser beam emitted from the laser beam source and in a manner maintaining the angle of 45°, for influencing an interference period Λ.

2. The optical arrangement as claimed in claim 1, wherein the reflecting mirror is displaceable over a maximum distance corresponding to a length of a cathetus of an isosceles triangle, wherein a length of an area of the first beam splitter whereon the laser beam deflected by the reflecting mirror is incident, is a hypotenuse of the isosceles triangle.

3. The optical arrangement as claimed in claim 1, wherein in that a plane-parallel waveplate is arranged in a beam path of at least one partial beam upstream of the focusing optical element.

4. The optical arrangement as claimed in claim 1, wherein second reflecting mirrors are arranged in a beam path of the first partial beam in such a way that the first and the second partial beams and if necessary the third partial beam each travel a distance of equal length until being incident on the focusing optical element.

5. The optical arrangement as claimed in claim 1, wherein the partial beams are directed through a Dove prism arranged between the first beam splitter, the first pentamirror or the pentaprism, the second pentamirror or pentaprism and the focusing optical element.

6. The optical arrangement as claimed in claim 5, wherein the Dove prism is rotatable about an axis oriented parallel to the optical axes of the partial beams, said axes being oriented parallel to each other.

7. The optical arrangement as claimed in claim 1, wherein the first beam splitter is embodied in such a way that energy proportions in a ratio 50:50 are obtained for the first partial beam and the second partial beam, when the first and second partial beams are directed to a respective surface in a manner interfering with one another or the first beam splitter is embodied in such a way that energy proportions in a ratio 33:66 are obtained for the first partial beam and the second partial beam and the second beam splitter is embodied in such a way that energy proportions in the ratio 50:50 are obtained for the third partial beam of the second partial beam and the fourth partial beam, when the first, third, and fourth partial beams are directed to the respective surface in a manner interfering with one another.

* * * * *